UNITED STATES PATENT OFFICE.

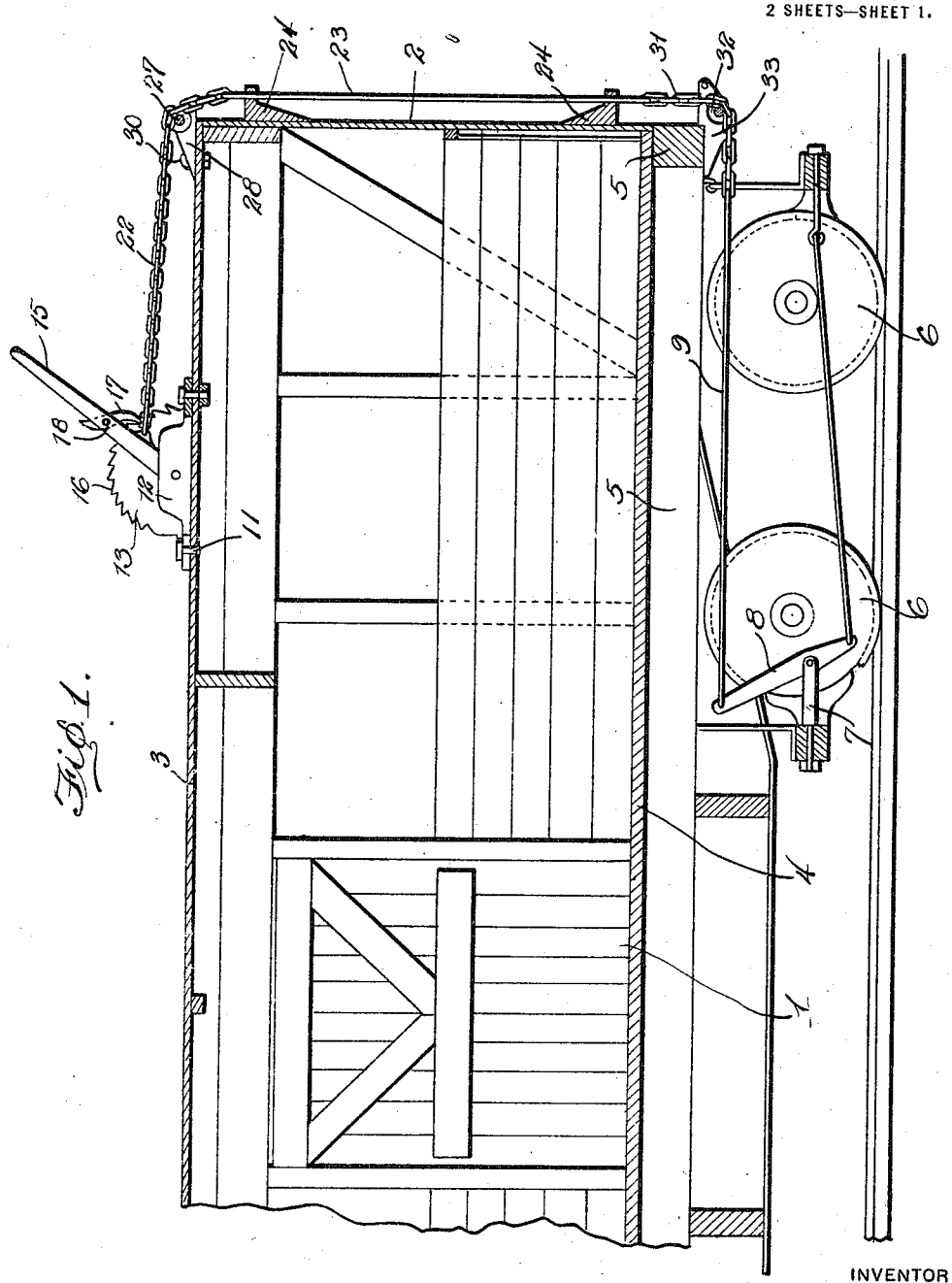

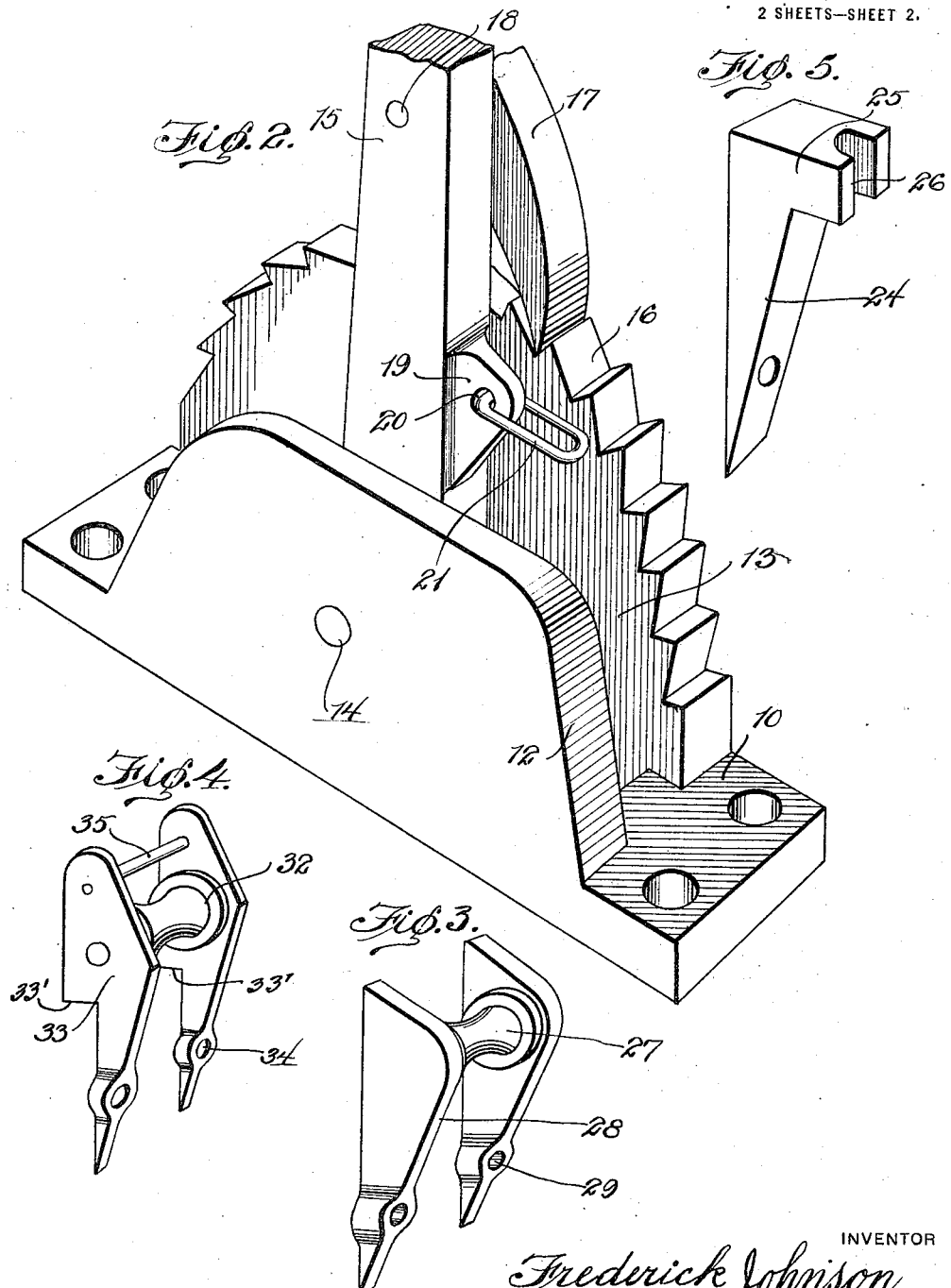
F. JOHNSON.
RAILWAY CAR BRAKE.
APPLICATION FILED OCT. 3, 1916.
1,269,086.
Patented June 11, 1918.
2 SHEETS—SHEET 2.

FREDERICK JOHNSON, OF WARBA, MINNESOTA.

RAILWAY-CAR BRAKE.

1,269,086.     Specification of Letters Patent.    Patented June 11, 1918.

Application filed October 3, 1916. Serial No. 123,520.

*To all whom it may concern:*

Be it known that I, FREDERICK JOHNSON, a citizen of the United States, residing at Warba, in the county of Itasca and State of Minnesota, have invented certain new and useful Improvements in Railway-Car Brakes, of which the following is a specification.

My invention relates to improvements in railway rolling stock and more particularly to an improved brake operating means, said means being provided with a view to afford safety to brakemen and the like who have occasion to apply the brakes of railway cars, particularly box cars, from the roofs thereof.

The principal object of my invention is to provide a brake actuating means which is adapted to be positioned on the roof of a box car and having connection with the usual brake and running gear of the car, suitable means being provided for locking the brakes in applied position.

With the above and other objects in view my invention resides preferably in the construction, combination, and arrangement of parts as hereinafter set forth in the specification as illustrated in the accompanying drawings, in which—

Figure 1 is a longitudinal sectional view of a railway box car showing my improved brake actuating mechanism applied thereto, Fig. 2 is an enlarged perspective view of a part of the invention, partly broken away, Fig. 3 is a detail perspective view of one of the guides for the chain of the operating mechanism, Fig. 4 is a similar view of another of said guides, and Fig. 5 is a detailed perspective view of one of the rod guides.

Similar reference characters designate similar parts throughout the various views of the drawing.

In the drawings, wherein the preferred embodiment of my invention is illustrated, I have shown a box car 1 having an end wall 2, roof 3, and bottom 4. The usual stringers for strengthening the bottom of said car are provided and are designated 5. The running gear of the car is of the usual type and includes the truck wheels 6 and brake mechanism 7. The brake lever 8 on one extremity has connection through a rod 9 with my improved operating mechanism.

My invention includes a base block 10 securely mounted upon the roof 3 of the car by means of bolts or the like 11. The base block 10 is provided with a plurality of upstanding spaced flanges 12 and 13, said flanges being provided with axially alined openings through which a pin or the like is disposed to receive and act as a pivot for a lever 15 receivable between said flanges. One of the flanges, viz., the flange 13 is provided with ratchet teeth 16 and a double end pawl 17 is pivoted on said lever 15 as indicated at 18 and is adapted to engage the teeth 16 to lock the lever in a given position. The lever is provided with a laterally extended lug 19 provided with a transverse opening 20 in which the terminal link 21 of a chain 22 is adapted to be connected. The free extremity of the chain 22 is connected to one extremity of a vertically slidable rod 23, said rod being mounted in guide brackets 24 fastened to one end of the car adjacent opposite extremities of said rod. One of the brackets 24 is shown to advantage in Fig. 5, it being noted from this view that the bracket is provided with an enlarged portion 25 recessed as at 26 to receive the rod. At the top of the car, adjacent the end thereof I provide an anti-friction roller or sheave 27 mounted in a suitable tapering bracket 28 provided with openings 29 through which bolts or the like fastening means 30 are disposed serving to securely mount said bracket on the edge of the roof of the car. As shown to advantage in Fig. 1, the chain is trained over said roller 27. The rod 23 is connected to the rod 9 by means of a relatively short chain 31, said chain being trained over an anti-friction roller 32 mounted in a bracket 33, said bracket having openings 34 in the arms thereof to facilitate connection. The arms are also notched, as shown at 33', thus providing a receiving portion for the end of the car, so that when the strain is brought to bear upon the bracket it will be relieved from the securing means of the bracket. A transverse rod 35 serves to connect the arms of the bracket 33 adjacent the roller 32 so as to prevent dislodgment of the chain.

In operation, the lever 15 is moved from the position shown toward the center of the car. This exerts a pull on the chain 22, the rod 23, chain 31 and rod 9, the latter having connection with the brake mechanism of the car. This will effectively apply the brakes. The advantage gained in this method resides principally in the fact that it is not necessary to rotate a cumbersome wheel many times before an effective braking action is obtained. Attention is also directed to the fact that it is unnecessary for the brakeman to locate himself between two cars when applying the brakes which not alone subjects him to the danger of falling between the cars, but will also place him in a position dangerous to life in a collision in which the cars telescope.

From the above description taken in connection with the accompanying drawings, it is though that a clear and comprehensive understanding of the construction, operation and advantages of my invention may be readily gathered and while I have shown and described the same as embodying a specific structure, I reserve the right to make changes therein which do not depart from the spirit and scope of the invention as claimed.

I claim:

In a device of the class described, the combination of a railway car having a brake mechanism, a tapering bracket fixed upon the top of the car and projecting beyond one end, a sheave carried by said bracket, the top portions of said bracket being unobstructed, tapering brackets fixed upon the end of the car, in alinement with the other, said tapering brackets having enlarged portions at their ends, said enlarged portions being recessed and unobstructed, a bracket having notched portions fitting upon the lower portions of the car, said last mentioned bracket having a sheave, a transverse rod carried at the outer portion of said last mentioned bracket, said rod being in direct alinement with the outer portions of the second mentioned brackets, the notched portions of said last mentioned bracket relieving the securing means of the last mentioned bracket from strain, a rod slidably mounted in the recessed portions of said second mentioned brackets, a flexible means extending from the last mentioned rod around the last mentioned sheave, whereby said transverse rod will engage the flexible means under certain conditions for holding said last mentioned rod against accidentally disengaging said second mentioned brackets and flexible means connecting the remaining end of said last mentioned rod and passing around the first mentioned sheave for actuating said brake mechanism.

In testimony whereof I affix my signature in presence of two witnesses.

FREDERICK JOHNSON.

Witnesses:
  E. M. WESTURN,
  SWAN CARLSON.

Copies of this patent may be obtained for five cents each, by addressing the "Commissioner of Patents, Washington, D. C."